United States Patent Office 3,179,486
Patented Apr. 20, 1965

3,179,486
PROPYLENE DYEING METHOD
James Dammicci, Raritan, N.J., assignor to American Cyanamid Company, Stamford, Conn., a corporation of Maine
No Drawing. Filed July 30, 1962, Ser. No. 213,147
14 Claims. (Cl. 8—115.5)

This invention relates to a process for modifying polypropylene thermoplasts; to the resultant modified products; and to the dyeing of products so produced. Further, it also contemplates novel modifying baths for the purpose and to the use of such baths. Still further, it is also concerned with a process for improving the dyeability of such thermoplasts and the dyeing of modified thermoplasts using available cationic dyes.

As contemplated in the present invention, polypropylene thermoplasts comprise long-chain paraffinic polymers consisting of recurring propylene groups

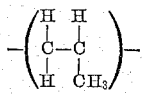

as building "blocks." These blocks are unsymmetrical but so arranged that each has the same relation in space, i.e., an "isotactic" configuration. The apparent molecular weight as determined by viscosity ($M_v$) may range from about 30,000 to as high as 300,000. In general, the density at room temperature will average about 0.9.

As used herein, the term "cationic dyes" is used to designate those dyes in which the colored portion of the dye molecule is either positively charged, i.e., a cation; or is capable of protonation. These dyes will be discussed more fully below.

Fibrous materials prepared from polypropylene thermoplasts have many excellent physical characteristics. They may be drawn into very fine filaments of the order of about 1.5 denier. Their great strength, good abrasion resistance, low specific gravity, and low static susceptibility make them easy to spin and weave. Their freedom from pilling and low moisture absorption enhances their use in production of "drip-dry" or "wash-and-wear" fabrics.

Unfortunately, due to this low moisture absorption characteristic, dyeing of polypropylene has presented an exceedingly difficult problem. Dyeings suffered from one or more of such defects as weak shades; surface-coatings of dye which crock badly; colors which bleed in laundering; partially-penetrated color which is removed in dry-cleaning; or shades which have poor fastness to light. Even when using the best methods previously known, in conventional dyeing operations satisfactory, medium-to-heavy shades were not obtainable.

Heretofore, medium-to-heavy shades have been obtained by adding pigments to the molten polypropylene before extruding the colored filament. This "solution-dyeing" procedure, too, is subject to several serious objections. Many, if not most, pigments are not sufficiently heat-stable and decompose at temperatures required for the hot melt. This seriously limits the number of obtainable shades.

Many pigments are not compatible with the thermoplastic polymer. Those which are used must be reduced to very fine particle size to permit the extrusion of low-denier yarn. Any pigment flocculation in the melt results in spinneret clogging with resultant production loss. Last, but not least, any cross-sectional area of the fiber occupied by a pigment particle reduces the amount of polypropylene in that same area and weakens the fiber. Accordingly, if maximum fiber strength is desired, such solution-dyed fibers are commercially unsuitable.

As shown for example in U.S. Patent 3,013,998; dyeability of some polymers of α-olefins has been modified to enable dyeing by improved absorption of acid dyes and disperse acetate dyes. This was accomplished by incorporating, prior to curing, some five to fifteen percent by weight based on the polypropylene of an uncured epoxy resin. This procedure is not useful for the present purposes. Acid dyes are anionic, i.e., the color is in the *negatively* charged portion of the molecule. The disperse acetate dyes do not carry an electrical charge.

Therefore, prior to the present invention, there still remained a need for a process for so-modifying polypropylene thermoplasts as to enable satisfactory dyeings, using commercially-available cationic dyes in conventional dyeing processes. Such a process should be simple and easily carried out in presently-available commercial equipment. It should be economically adaptable to dyeing not only fibrous material including tow, filaments, yarns, woven or nonwoven fabrics, webbing and the like but also sheets, films and the like. Last, but not least important, it should not result in physical damage to the propylene thermoplast products.

In general, the overall process of the present invention may be simply described. The polypropylene thermoplast, usually in the form of fibers, is subjected to the following operations. Therein all proportions and percentages are based on the weight of solution (ows.).

(1) At ambient room temperature, the material is wet out in an aqueous oxidizing bath containing some 0.1 to 0.25 percent sodium hypochlorite (100% available chlorine) and 0.5 to 1.25 percent hydrochloric acid (real). Usually, but not necessarily, some 0.01 to 0.04% (ows.) of a commercially-available surfactant of the nonionic type will be added to the aqueous oxidizing bath.

(2) The material is then treated in this solution until it acquires a distinctly yellowish coloration. This is a distinctive feature of the overall operation. While no definite time limit can be established, in usual practice this step will be carried out in some five to ten minutes.

(3) Then some 0.1 to 0.5 percent (ows.) of a sulfur-bearing reducing agent such as sodium metabisulfite is then added to the oxidizing bath.

(4) Agitation of the material is continued until the yellowish coloration disappears, resulting in a clean white color. Again, while no definitive time limit can be established, this step will ordinarily be completed in some five to ten minutes.

(5) So-modified material is then removed from the bath. If the resultant modified material is to be dyed, it may be then entered directly into the dye bath. If so desired, however, the modified product material may be retained for various periods of time before dyeing. In such cases, it is within the contemplation of my invention to include a sixth, or drying, step.

As so described, treatment by the process of the present invention appears deceptively simple. Each of the several steps are important. Each involves certain criteria which within certain ranges must be observed. Therefore, each will be more fully discussed in relation to the problem solved thereby, as well as its place in the overall treatment.

As noted above, an advantage of the present process is that it may be carried out using presently-available plant equipment with commercially-available chemicals.

Treatment as outlined above may be described as a "batch" process in which only a single piece of equipment is employed. Therein, the polypropylene is contacted with the various chemicals in successive steps. Such a batch procedure will be taken as illustrative and discussed in detail, being used in the illustrative examples. However, this is not a limitation. When large-scale equipment, such as open-soapers, dye-kettles, or equivalent continuous machines, is available, the polypropylene is moved in a continuous process from the hypochlorite, or oxidizing, bath through a pair of squeeze rolls to remove the excess oxidizing liquid and then into the metabisulfite bath after which the treating liquor is separated from the polypropylene. Such an operation is more economical and will be utilized wherever it is practicable. For staple polypropylene, useful in the preparation of woven or nonwoven fabrics, a series of conventional scouring bowls may be used. Consequently, the particular equipment utilized in the process may vary widely depending upon the quantity and type of polypropylene being treated as will be readily apparent to those skilled in the art.

However, regardless of the equipment employed, the outlined steps must be complied with. For example, the rate of "feed-in" should be adjusted to permit the polypropylene during contact with the alkali-metal hypochlorite to acquire the above-noted distinctive yellow shade and, thereafter, to lose this yellow shade during contact with the sulphur-bearing reducing agent bath.

It is not certain what modification of the polypropylene occurs in the treatment of this invention nor how it occurs. That it does occur and that a completely different "modified" fiber is obtained is clearly shown by the change in dyeability. This is more fully discussed in conjunction with the examples below.

From the foregoing discussion, it is apparent that a critical feature of the present invention is the visual control which is possible. In one set of steps a yellow coloration develops. In a subsequent set it is removed. The ease with which this may be visually observed and the high degree of success which is obtainable are both features and advantages.

THE OXIDATION PROCEDURE

It will also appear that Steps 1 and 2 as outlined above may be grouped for discussion under the classification of the "oxidation" procedure. This includes formulation of the oxidizing bath, and therein carrying out the "wetting out" and the color-development steps.

As noted above, the oxidation bath contains two critical components and an optional one; i.e., the "oxidant," the acid and the surfactant, respectively. Optionally other conventional components may be present if they do not interfere with these three.

The first critical factor is choice of the oxidant. The oxidant selected is an alkali-metal hypochlorite, with sodium or potassium hypochlorite being preferred. A salt of about fifteen percent available chlorine produces excellent results to be obtained.

As to the amount to be employed, it should be sufficient to furnish from about 0.1 to 0.24 percent (ows.) based when calculated as 100% available chlorine. This would be about 6.7 times the above percentages when the illustrative hypochlorite of some 15% available chlorine is used. In general, use of from about 0.12 to about 0.2 percent (ows.) of available chlorine will be found to be good practice.

If so desired, the required amount of the sodium hypochlorite (as the illustrative chlorine source) also may be expressed in terms of the weight of the fibrous material (owf.) to be modified. When so-expressed, some ten to twenty-five percent (owf.) of 100% available chlorine may be used, although from about twelve to about eighteen percent represents a good general practice.

The second critical feature of the modifying bath is the inclusion of a strong, highly-ionizable acid, preferably a mineral acid such as hydrochloric acid. The amounts to be used are given herein as "real," i.e. as 100% acid. Equivalent amounts of aqueous acid are readily calculated. On the weight of the solution, about 0.4 to 1.25 percent real hydrochloric acid should be employed; about 0.5 to about 1.0 percent generally being preferred. Illustratively, commercially-available concentrated hydrochloric acid contains some 36–37 percent hydrogen chloride. To obtain the amount of such solution to be fed, the "real" figures would be increased by 100/36–37 or about three times. Modifying baths of correct acidity generally will be found to range from about pH 3.5 to about pH 1. On the weight of the fiber (owf.), the amount of real hydrochloric acid may range from about fifty to about one hundred twenty-five percent. From about sixty to about eighty percent is a good practice.

While the use of hydrochloric acid is perhaps a preferred practice in carrying out the present invention the latter is not necessarily so limited in practice. When desired or necessary other strongly-ionizable acids such as sulphuric or the chlorinated aliphatic acids (chlorinated acetic, etc.) assist in the modification of the polypropylene.

The third or optional feature is the addition of a nonionic surfactant to the aqueous modifying bath. Although it is not critical, it serves two useful purposes: (1) it speeds up the oxidation and (2) it may cause more uniform results to be obtained; probably due to more uniform wetting of the fiber. Suitable nonionic surfactants useful in my invention include condensates of ethylene oxide with long chain fatty acids, condensates of ethylene oxide with long chain fatty alcohols, ethylene oxide condensates with long chain fatty amides, and the like. Examples of the alkyl aryl polyethylene glycol ethers are the alkylphenoxy poly(ethyleneoxy) ethanols, particularly the octylphenoxy poly(ethyleneoxy) ethanol, nonylphenoxy poly(ethyleneoxy) ethanol, and dodecylphenol polyoxyethylene ethanol. Examples of the polyoxyethylene fatty acid esters include ethoxylated stearic acid, polyoxyethylene stearate, polyethyleneglycol esters and polyoxyethylene glycol laurate. Other compounds useful in my invention include long-chain alcohol ethylene oxide condensates, alkyl polyether alcohols and ethylene oxide condensates of fatty acid amides. The alkylphenoxy poly(ethyleneoxy) ethanols cause excellent results to be obtained. Specifically, I prefer the nonionic surfactants obtained by condensing six to twelve molecules of ethylene oxide with one mol nonylphenol. As to the amount of surfactant to be used, this may vary from about 0.01 to about 0.04 percent (ows.) or from about two to about three percent (owf.).

As discussed above, a feature of Step 2 is to allow sufficient time for the development of the visual coloration. During this period, the wetted out polypropylene is agitated in the aqueous, acidic oxidizing bath until the polymer acquires a distinctly yellow color. At ambient room temperature, usually some 40° to 90° F., this will ordinarily occur in from about eight to about twenty minutes. However, if the treating temperatures are cooler or warmer, longer or shorter periods, respectively, may be required. To those skilled in the art, the distinctive yellow color imparted to the polypropylene by the aqueous oxidizing bath will clearly and readily indicate the completion of oxidation treatment, i.e., of the above-noted Step 2.

THE REDUCTION TREATMENT

The second characterizing feature of the present process is the removal of the yellow coloration in the "reduction treatment." The latter includes both neutralizing the oxidizing bath still associated with the fiber (Step 3 above) and the continued treatment during which the color is destroyed (Step 4 above). Suitable aqueous baths during this treatment should have about the same acidity found in the oxidizing bath or baths.

The reduction agent of choice is a sulfur-containing type. Of these sodium or potassium metabisulfite are perhaps preferable. After completion of oxidation, sufficient sodium metabisulfite, as illustrative, is then added to the aqueous oxidizing bath to "kill" or "neutralize" any excess hypochlorite. Usually 0.1 to about 0.5% metabisulfite (ows.) will be required. On the weight of the fiber (owf.), use of some twenty to thirty weight percent is good practice.

Other alkali-metal metabisulfites or sulfites also may be employed in my novel modifying baths. It is also within the scope of my invention to use sulphurous acid or aqueous solutions of sulphur dioxide to "kill" the excess oxidizing agent. However, because it is a solid, easily handled and economical, sodium (or potassium) metabisulfite makes for good convenient operation.

It is an advantage of my novel process that the sodium metabisulfite may be added in small portions over a period of two to about twenty minutes. As the excess metabisulfite is "killed" the distinctive yellow color of the polypropylene disappears leaving a modified product characterized by its excellent whiteness.

In a batch process, all the sodium hypochlorite is "killed" or neutralized. Where small batches are being modified, simplicity of such treatment may outweigh the economic disadvantages of neutralizing all the unused hypochlorite. However, where large quantities of the polypropylene are being modified, it is preferred to utilize a *continuous* process. In such an operation the oxidizing solution preferably is separated from the polymer at this point by passing the polymeric material through a pair of squeeze rolls, or other suitable conventional means. The hypochlorite-treated material then is entered into a separate, acidic metabisulfite bath. Regardless of the method employed, the metabisulfite treatment is continued until the yellow color of the polymer has disappeared and the modified fiber has acquired its characteristic whiteness.

In general, the pH of the metabisulfite bath may be maintained at about 1.5 to 4.0. Generally a pH range of from about 1.6 to 3.5 will be found a good practice in all but exceptional cases.

SEPARATING THE MODIFIED POLYMER FROM THE REDUCTION TREATMENT SOLUTIONS

Resultant modified polymer is then separated from the aqueous treating bath. Usually this is done simply by rinsing in water. Water at about room temperature is usually satisfactory. Modified material also may be given a second or warm water rinse if so desired.

As noted above, if modified material is to be dyed, it may be entered directly into the dye bath. A drying step is thereby eliminated. However, if the modified material is to remain undyed or be held over a period of time before dyeing, the residual rinse water is removed by drying. Temperatures between about 160° F. and 180° F. are usually found suitable.

DYEING THE MODIFIED POLYPROPYLENE

Modification of the polypropylene causes it to be receptive to cationic dyes when they are applied by conventional dyeing methods. Resultant dyed products are well penetrated by the dye and are resistant to bleeding, crocking and dry cleaning; they have bright hues and can be obtained in medium-to-heavy (strong) shades. As noted above, the colored portion of the dye molecule either carries a positive charge, or is capable of receiving a positive charge, i.e., capable of protonation.

Examples of cationic or quaternized dyes which carry a positive charge are the basic dyes including the more-recently developed cationic dyes. Typical groups from which these dyes are derived are the diphenyl methanes, triphenyl methanes, diphenyl trinaphthyl methanes, pyronines, diazines, oxazines, thiazines, etc. Typical examples of these general classes are Basic Blues 6, 9, 14 and 26; Basic Oranges 1 and 2; Basic Greens 1, 4 and 5; Basic Brown 1; Basic Reds 2 and 9; Basic Violets 1, 2, 10 and 14; Basic Yellow 2 and the cationic dyes described in U.S. Patents 2,864,813; 2,883,373; 2,889,315; and 2,893,816.

Examples of unquaternized dyes capable of protonation are the free bases of the dyes represented by the cationic dyes listed above. On reaction with an acid these free bases are capable of protonation. Sulfamic acid is especially useful for this purpose. It can be blended with the dye or added to the dye bath. Other acids, such as acetic, formic and sulphuric are useful but, because they are liquid, are not blended with the dye-base but are added to the dye bath. The cationic, or quaternized, types and the basic dyes in the form of their inorganic salts are directly soluble in the dye bath. The other dyes form soluble, positively-charged dyes in the acidic dye bath.

All the dyes described above are included in my definition of "cationic" dyes. They do not give full, strong shades on polyproylene until the polymer is modified after which they may be applied by conventional methods described below. These methods include weakly acid dye baths and/or the presence of salt or other assistants normally used in dyeing. The polyproylene material thus dyed has a strong color. The dye is well penetrated as is readily evident when a cross-section of the dyed product is examined microscopically. The dyed material does not crock and does not bleed or wash out either with water or by dry cleaning, and has a fastness-to-light superior to tinted, unmodified polypropylene.

The invention will be more fully described in conjunction with the following examples which are intended as illustrative. Unless otherwise stated, all parts and percentages are by weight. Concentration percentages of the ingredients in the modifying baths are based on the weight of the solution of the modifying or treating liquors when indicated as (ows.). When percentages are based on the weight of the polypropylene material, they are indicated as (owf.). All temperatures are indicated in degrees Fahrenheit.

In the first example various components of the modifying bath or baths of this invention are utilized singly. This example is offered to illustrate their separate effect, or lack of effect, in the modification process of the present invention.

Example 1

Portions (2" x 3") of a commercially-purchased, undyed polypropylene fabric are treated for about 20 minutes in the following solutions:

(1) With water only, at room temperature;
(2) With two milliliters of aqueous hydrochloric acid (37.5%), at room temperature;
(3) With two milliliters of aqueous sodium hypochlorite (15% available chlorine), at room temperature;
(4) With 250 milligrams of sodium metabisulfite in sufficient water to dissolve the metabisulfite, at room temperature.

So-treated portions are then placed in a single dye bath prepared as follows.

Two-hundred milligrams of the dye Basic Green 4 (Malachite Green) is dissolved in 50 ml. warm water and diluted to 400 ml. with water. In a separate container, 0.5 ml. of Renex 30 (a liquid, nonionic, polyoxyethylene ether alcohol sold by the Atlas Powder Company, Wilmington, Delaware), is added to one gram β-naphthol, after which sufficient 30° Bé. caustic soda is added to dissolve the β-naphthol. This solution is then added to the dye bath, followed by addition of 20 mg. sodium chloride and 10 ml. of a 10% solution of 28% acetic acid.

Dyeing is carried out at about 200° F. for about sixty minutes, after which portions of the fabric are removed and washed with water. So-treated portions of fabric are only weakly tinted.

Example 2

Additional portions of the same polypropylene fabric used in Example 1 are treated using the same chemicals used in Example 1 but following the procedure of the present invention. Each sample is treated in a modifying bath consisting of 2 ml. aqueous hydrochloric acid (37.5%), combined with 1 ml. aqueous sodium hypochlorite (15% available chlorine).

The polypropylene fabric portion is agitated in this solution at ambient room temperature for about ten minutes at the end of which time it has acquired a characteristic yellowish shade. Then 250 mg. sodium metabisulfite dissolved in just sufficient water to ensure complete solution is added to the fabric and aqueous, acidic hypochlorite bath. Stirring of the fabric in the solution is continued for about ten minutes at ambient temperature, at the end of which time the yellow color has disappeared.

The modified material is then removed from the bath, washed with cold water and then with warm water. The modified polypropylene has an excellent white shade characteristic of the modified material. So-treated fabric portions then are dyed in the same dye bath of Example 1 by the procedure outlined therein.

Dyeing of full Malachite-Green shade is obtained, indicating that the polypropylene fabric has been modified by the treatment. Dyed material does not crock or bleed and is resistant to color loss in washing and in dry cleaning. A cross-section of the dyed fiber examined under a microscope shows the dye has penetrated through the fiber.

*Example 3*

In the following group of examples, ten-gram portions of the polypropylene fiber of Example 1 are treated. Two one-liter baths are prepared by mixing 970 ml. water,
10 ml. sodium hypochlorite solution (15% available chlorine),
20 ml. concentrated hydrochloric acid (37.5% real),
0.25 ml. liquid nonionic surfactant (nonylphenol reacted with about nine mols ethylene oxide).

A ten-gram piece of the polypropylene fabric is entered into one bath. Ten grams of raw stock is entered into the other. Polypropylene in each bath is agitated at room temperature for about ten minutes during which time the fibrous material acquires a yellow color. To each bath is then added 2.5 grams sodium metabisulfite, and agitation is continued for an additional ten minutes, after which time the yellow color has been replaced by an excellent white, indicating that the excess sodium hypochlorite has been destroyed. The materials are then removed, rinsed in cold water and, without drying, dyed in a dye bath having the same composition as described in Example 1. Dyeing is carried out at the boil for one-half hour, after which the dyed material is removed, rinsed with warm water, then with cold water, soaped to remove unattached dyestuff from the surface of the fiber, again rinsed to remove the soap solution, and air dried.

Dyeings of deep, blue-green characteristic of Malachite Green are obtained indicating that both the polypropylene fabric and the raw-stock are modified by the treatment. Test dyeing of an untreated control sample of the fabric results only in faint green tinting.

*Example 4*

The procedure of Example 3 is repeated except the modified fibrous material is dyed with Magenta (New Colour Index No. 42510). A deep Bordeaux or Corinth shade is obtained indicating that the polypropylene is modified by the treatment.

Dyeings made in Examples 3 and 4 do not bleed or crock. When viewed under the microscope, cross-sections of the dyed materials show that the fiber is well penetrated by the dye.

*Example 5*

Ten-gram portions of polypropylene fabric are modified as in Example 3 after which they are removed from the treating bath and rinsed with water. Without drying, the modified fabric portions are dyed following the general procedure of Example 3, except the dyeing is carried out at the boil for one hour. Dyeings are made using each of the eight cationic dyes listed to replace the dye of Example 3. In every instance brilliant, deep shades are obtained in dyeings which are stable to dry cleaning and which do not crock or bleed. The dyes used and the hues obtained follow:

| Dye | Generic Class | C.I. Number | Hue |
|---|---|---|---|
| Auramine G | Diphenylmethane | 41005 | Greenish-yellow. |
| Rhodamine Scarlet G | Pyronine | 45015 | Red. |
| Para Rosaniline | Triphenylmethane | 42500 | Magenta. |
| Safranine T | Diazine | 50240 | Pink. |
| Methyl Violet | Triphenylmethane | 42535 | Violet. |
| Rhodamine B | Rhodamine | 45170 | Blue-red. |
| Nile Blue | Oxazine | 51180 | Blue. |
| Basic Blue 26 | Diphenylnaphthylmethane. | 44045 | Blue. |

Dyeings on untreated control samples of the same polypropylene fabric by the same procedure with the same dyes result only in production of light tints.

*Example 6*

In the following example the procedure of Example 3 is repeated except the nonionic surfactant is omitted from the solution in the oxidizing treatment bath. The rate of the oxidation reaction on the polypropylene is slowed down. More time is required to obtain the yellow shade of coloration obtained in about ten minutes in Example 3. When the treated fabric is subsequently dyed according to Example 3, the shade is a bright, medium-to-heavy blue-green indicating the fiber to have been modified.

*Example 7*

Ten-gram portions of polypropylene fabric are modified as in Example 3. Treated portions are dyed by the procedure of Example 3 using dye baths each containing one of the following dyes.

| Dye Used | Hue |
|---|---|
| 6-ethoxy-3-methyl-2-(p-morpholinophenylazo)-benzothiazolium methyl sulfate. | Blue. |
| 2,4-dimethyl-3-(4-dimethylaminophenylazo)-1,2,4-triazolium tosylate. | Red. |
| 1-methyl-2-(p-dimethylaminophenylazo)-pyridinium methylsulfate. | Violet. |
| 1,3-dimethyl-2-p-aminophenylazoimidazolium methylsulfate. | Orange. |
| 2,4-dimethyl-3-(4-dimethylaminophenylazo)-1,2,4-triazolium iodide. | Red. |

In each dyeing, full strong shades are obtained indicating that the polypropylene fiber has been modified. The dyed fabrics do not bleed or crock, and microscopical examination of the cross-sections of the dyed fibers show that the dye is well penetrated into the fiber.

*Example 8*

Ten-gram portions of polypropylene fabric are modified as in Example 3. So-modified portions are dyed with dyes capable of protonation. Sulfamic acid is used in the following dyeing procedure. 25 mg. of dye and 25 mg. sulfamic acid are dissolved in 50 ml. water, and then brought to a volume of 200 ml. with boiling water. To this is added 2 ml. of a 5% solution of 28% acetic acid. A separate bath is made from each dye. A ten-gram portion of the modified polypropylene fabric is then entered into each bath and held at 200° F. for one hour, the fabric being stirred at intervals to aid in uniform distribution of the dye. The dyed samples are then removed, washed and dried. The following dyes are used:

| Dye | Hue |
|---|---|
| 2,4-diamino-5-(p-tolylazo)-6-hydroxy-pyrimidine | Yellow. |
| 4-amino-2-dimethylamino-5-(p-methoxyphenylazo)-6-hydroxy-pyrimidine. | Orange. |
| 1-(p-dimethylaminomethylphenylazo)-2-naphthol | Do. |
| 2-(p-aminophenylazo)-3-methylimidazole | Do. |
| 2-(p-dimethylaminophenylazo)-pyridine | Blue-red. |
| Basic Brown 1 (C.I. No. 21000) | Brown. |
| Basic Brown 4 (C.I. No. 21010) | Do. |

In each instance a strongly-colored shade is obtained.

I claim:

1. A process for modifying polypropylene thermoplasts and rendering them dyeable with cationic dyes, which process comprises the following steps:
   (a) treating said material at ambient temperature with an aqueous composition comprising an alkali-metal hypochlorite solution and a highly-ionizable acid, at a pH of from about 1 to about 3.5 for a period of not more than twenty minutes but sufficiently long to develop on the material a yellow coloration readily visible in daylight; and
   (b) treating the resultant yellow-colored material at ambient temperature with an aqueous reduction bath comprising a highly-ionizable acid and a sulphur compound selected from the group consisting of alkali-metal sulfites, alkali-metal metabisulfites, and sulphurous acid at a pH of from about 1.5 to about 4.5 for a period of less than about twenty minutes but sufficiently long to eliminate said visible yellow coloration.

2. A process as defined in claim 1 wherein said aqueous compositions comprising an alkila-metal hypochlorite solution and a highly-ionizable acid contains an amount of hypochlorite sufficient to produce 0.1 to 0.25 weight percent available chlorine based on weight of solution.

3. A process as defined in claim 1 wherein said aqueous reduction bath contains 0.1 to 0.5 weight percent alkali-metal metabisulfite on weight of solution.

4. A process as defined in claim 1 wherein said highly-ionizable acid is selected from the group consisting of hydrochloric acid, sulfuric acid, and chloracetic acid.

5. A process as defined in claim 1 including the additional step of dyeing the thus decolorized material with a cationic dye.

6. The product modified by the process of claim 1.

7. The colored product of claim 5.

8. A process as defined in claim 1 wherein said aqueous composition comprising an alkali-metal hypochlorite solution and a highly-ionizable acid includes a non-ionic surfactant.

9. A process as defined in claim 8 wherein said aqueous composition comprising an alkali-metal hypochlorite solution and a highly-ionizable acid contains an amount of hypochlorite sufficient to produce 0.1 to 0.25 weight percent available chlorine based on weight of solution.

10. A process as defined in claim 8 wherein said aqueous reduction bath contains 0.1 to 0.5 weight percent alkali-metal metabisulfite on weight of solution.

11. A process as defined in claim 8 wherein said highly-ionizable acid is selected from the group consisting of hydrochloric acid, sulfuric acid, and chloracetic acid.

12. A process as defined in claim 8 including the additional step of dyeing the thus decolorized material with a cationic dye.

13. The product modified by the process of claim 8.

14. The colored product of claim 12.

References Cited by the Examiner

UNITED STATES PATENTS

| 2,883,373 | 4/59 | Bassard et al. | 260—146 |
| 2,889,315 | 6/59 | Bassard et al. | 260—146 |
| 2,893,816 | 7/59 | Tsang et al. | 8—55 |

FOREIGN PATENTS

| 202,069 | 3/56 | Australia. |

OTHER REFERENCES

Finch: Fibers and Plastics, January 1960, pp. 14–16.

NORMAN G. TORCHIN, *Primary Examiner.*